United States Patent [19]

Baba et al.

[11] Patent Number: 4,523,801
[45] Date of Patent: Jun. 18, 1985

[54] SCANNING OPTICAL SYSTEM SUBJECTED TO A MOISTURE PROOF TREATMENT

[75] Inventors: Takeshi Baba; Noriyuki Nose, both of Yokohama; Hideo Yoshikawa, Tokyo; Kazuo Minoura, Yokohama; Akinori Hasu, Sagamihara; Setsuo Minami, Kawasaki; Kazuhiko Matsuoka, Yokohama, all of Japan

[73] Assignee: Canon Kabushiki Kaisha, Tokyo, Japan

[21] Appl. No.: 351,936

[22] Filed: Feb. 24, 1982

[30] Foreign Application Priority Data

Mar. 3, 1981 [JP] Japan .................... 56-30352

[51] Int. Cl.³ ............................. G02B 27/17
[52] U.S. Cl. ...................... 350/6.8; 350/582
[58] Field of Search .............. 350/6.8, 582, 589

[56] References Cited

U.S. PATENT DOCUMENTS

| 3,109,097 | 10/1963 | Waard et al. | 350/1.4 |
|---|---|---|---|
| 3,622,218 | 11/1971 | Kruger | 350/1.4 |
| 3,750,189 | 7/1973 | Fleischer | 350/6.7 |
| 3,883,214 | 3/1975 | Hoffman | 350/1.4 |
| 4,379,612 | 4/1983 | Matsuoka et al. | 350/6.8 |

FOREIGN PATENT DOCUMENTS 2353296  5/1974  Fed. Rep. of Germany ...... 350/582

Primary Examiner—John K. Corbin
Assistant Examiner—Rebecca D. Gass
Attorney, Agent, or Firm—Fitzpatrick, Cella, Harper & Scinto

[57] ABSTRACT

An optical system for scanning a medium with a beam spot includes a light beam generator, a deflector for deflecting the light beam in a predetermined direction and in deflection plane, and an imaging optical system between the deflector and the medium for imaging the light beam from the deflector on the medium as a beam spot, the imaging optical system having at least one lens element mode of a moisture absorbing material. The lens element has a shape in which the dimension in a direction parallel to the deflection plane of the light beam is greater than the dimension in a direction perpendicular to the deflection plane of the light beam. A device mitigates any influence on the imaged condition of the light beam on the medium caused by the lens element being subjected to moisture.

5 Claims, 13 Drawing Figures

SCANNING OPTICAL SYSTEM SUBJECTED TO A MOISTURE PROOF TREATMENT

BACKGROUND OF THE INVENTION

1. Field of the Invention

This invention relates to a scanning optical system having an imaging optical system including a lens element formed of a plastic material.

2. Description of the Prior Art

If plastic materials represented by acryl are used, optical parts can be processed at very much lower cost by molding or the like using a metal mold than can optical parts made by the method of polishing glass. Also, optical parts of non-spherical shape which are difficult to process by glass polishing can be mass-produced relatively easily.

However, it is well known that plastic optical members formed of acryl or polystyrene, on the other hand, suffer from a serious problem that as compared with glass, they exhibit great fluctuation in their optical characteristics as a result of variations in environmental conditions such as temperature and humidity.

Description will hereinafter be made of the practical problems which will be encountered when a lens formed of such plastic material having a moisture absorbing property is used in the interior of a scanning optical system.

FIG. 1 of the accompanying drawings shows the arrangement of a scanning optical system. The light beam emitted from a light source portion 1 is deflected by a deflector 2 in a plane orthogonal to the rotary shaft of the deflector 2. The deflected light beam is formed as an imaged spot on a medium 4 to be scanned by a lens group 3, thereby effecting flying spot scanning.

In the above-described optical system, the lens group 3 not only images a spot on the medium to be scanned, but also has the important function of imparting a strain characteristic peculiar to the scanning optical system.

What should be noted is the light beam passage area in each lens within the lens group 3 and, because the light beam deflected by the deflector passes through it, it is necessarily longer in the deflection direction x as shown by the hatching in FIG. 2 and shorter in the direction y orthogonal to the deflection direction. Accordingly, the shape of each lens may be made such that in order to cover the light beam passage area, it is longer in the deflection direction x and shorter in the direction y orthogonal to the deflection direction, as shown in FIG. 2, whereby the optical system becomes compact and moreover, manufacture of the lenses becomes easy.

If the material of the lens having a cross-sectional shape perpendicular to the optical axis as shown in FIG. 2 is plastic, molding can be easily accomplished by compression, injection or casting.

In contrast, FIG. 3 shows a case where the cross-sectional shape of a lens perpendicular to the optical axis is circular, and it is obvious in this figure that, as compared with FIG. 2, there are many areas of the lens other than the light beam passage area indicated by hatching. If the less wasteful shape of FIG. 2, instead of that of the shape of FIG. 3, is adopted, not only the construction of the molding apparatus can be simplified but also the molding time can be reduced.

In the scanning optical system of U.S. Pat. No. 3,750,189, there is disclosed a lens having a shape longer in the deflection direction of light beam. If a plastic material such as acryl having a moisture absorbing property is used for such a lens, there will occur a problem that moisture absorption affects the imaging performance of the lens.

Forming a lens into a shape longer in the deflection direction is very effective in molding as noted above, but as compared with a lens having the cross-sectional shape as shown in FIG. 3, it suffers from great influence of moisture absorption in the direction y orthogonal to the deflection plane.

SUMMARY OF THE INVENTION

It is an object of the present invention to provide a scanning optical system that imaging performance of which is not affected by humidity and that includes, as a lens element forming an imaging optical system for scanning, a lens element having a shape longer in the direction of the deflection plane than in the direction orthogonal to the deflection plane and formed of a plastic material.

In the scanning optical system according to the present invention, the above object is achieved by treating, with at least a moisture proof member, the portion of the surface of the above-described plastic lens element in which the uniformity of the refractive index in the direction orthogonal to the deflection plane will be affected by humidity.

In this plastic lens element, two non-lens surfaces, having surfaces in a direction substantially parallel to the deflection plane, are subjected to a moisture proof treatment. In an embodiment of the present invention which will hereinafter be described, a lens element has the light ray non-passage portion of the lens surface thereof subjected to the moisture proof treatment. Such moisture proof treatment, as compared with the moisture proof treatment of the portion through which light rays actually pass, is very advantageous in that it can be carried out without the transparency of the surface after treatment being taken into consideration.

The invention will become more fully apparent from the following detailed description thereof taken in conjunction with the accompanying drawings.

DESCRIPTION OF THE PREFERRED EMBODIMENT

Figure 4:
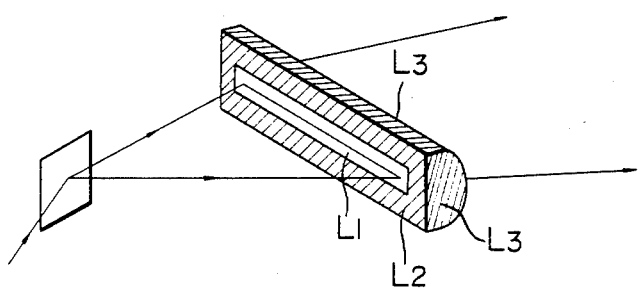
FIGS. 4 and 5 are views for illustrating the moisture proof treatment of a lens element used in the scanning optical system according to the present invention.

In this specification and the concluding claims, as shown in FIG. 4, the following terms have the following meanings: The term "lens surface" means the entire surface of a body assuming the form of a lens. The term "lens face effective portion $L_1$" means a surface through which light rays actually pass and are refracted at the lens surface and which has been polished or shaped with particular attention paid to the surface accuracy or the smoothness of the surface. The term "lens face non-effective portion $L_2$" means a portion which is an extension of said lens face effective portion and which has a curvature similar to that of the lens face effective portion but through which light rays do not pass.

The term "lens face" means a face comprising said lens face effective portion plus said lens face non-effective portion. The term "non-lens surface $L_3$" means a portion of said lens surface except the lens face, and the term "light ray non-passage portion" means a face comprising said lens face non-effective portion plus said non-lens surface. The invention will hereinafter be described in detail.

Generally, when a plastic material contains moisture by moisture absorption, the refractive index thereof is varied and the amount of variation in the refractive index is proportional to the amount of moisture so contained.

Figure 5:
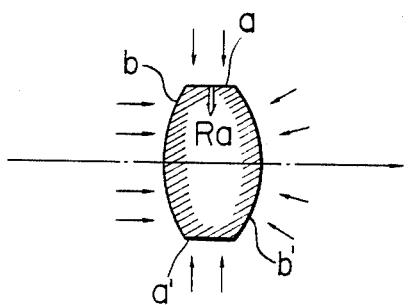

As shown in FIG. 5, moisture absorption occurs from the lens surface and therefore, when a dry plastic lens has been placed under high humidity, moisture absorption first progresses only in the lens medium near the surface and does not permeate into the interior of the lens, which thus hardly contains moisture.

In this condition, non-uniformity of refractive index occurs in the interior of the lens.

Generally, in a non-homogeneous medium wherein the refractive index at a point $\varkappa$ in the interior of the medium is given by $n\varkappa$, the optical path along which a light ray passing through a point $\varkappa_0$ and having a direction cosine $\varkappa_0$ travels can be obtained by solving the following two-stage differential equation $$\frac{d}{d_s}\left[n(\varkappa)\frac{d\varkappa(s)}{d_s}\right] = \nabla n(\varkappa) \quad (1)$$

under initial conditions $$\varkappa(s=0) = \varkappa_0 \quad (2)$$

$$\varkappa \frac{d}{d_s}(s=0) = \varkappa_0$$

where $\varkappa(s)$ represents the position vector of a point on the optical path, s represents the length of the optical path passing through the point $\varkappa_0$ and the point $\varkappa(s)$, and $d\varkappa(s)/d_s$ represents the direction cosine of the light ray at the point $\varkappa(s)$ and is expressed as $\varkappa(s)$.

If equation (1) is transformed, there is obtained the following:

$$n(\varkappa)\frac{d}{d_s}\varkappa(s) = \nabla n - (\varkappa \cdot \nabla n)\varkappa \quad (3)$$

That is, in accordance with equation (3), the direction cosine $\varkappa(s)$ of the light ray varies as the light ray travels through the interior of the non-homogeneous medium. Apparently, the direction cosine $\varkappa(s)$ of the light ray is constant in a homogeneous medium and the light ray travels rectilinearly therethrough.

Hence, in a plastic lens having a moisture absorbing property, refractive index is uniform in dry conditions and light rays travel rectilinearly through the interior of the lens, whereas when the lens absorbs moisture, a non-uniform distribution $n(\varkappa)$ of refractive index occurs and therefore, as the light rays travel through the interior of the lens, they vary their direction with a result that they are imaged at a position different from that in dry conditions. The degree of non-uniformity differs depending on the time during which the lens is left under high humidity condition, and therefore the imaging point varies with time.

Figure 1:
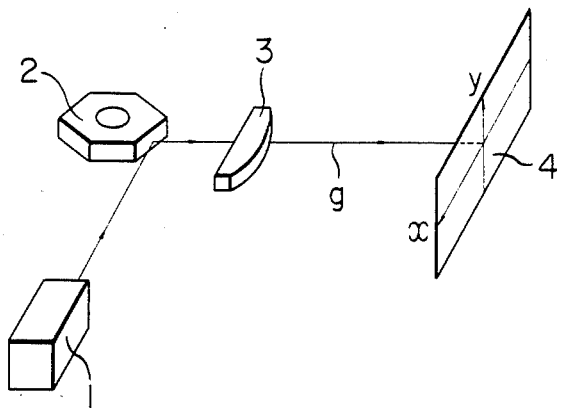
FIG. 1 shows an embodiment of the scanning optical system according to the prior art.
Figure 2:
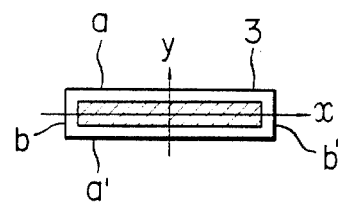
FIGS. 2 and 3 are views for illustrating the passage of light rays through a scanning lens.
Figure 3:
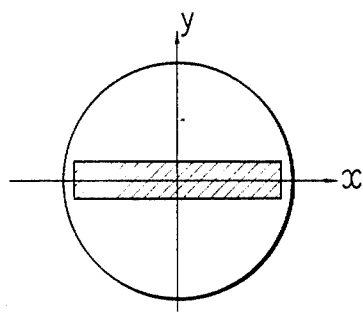

In a lens having the shape as shown in FIG. 2 which is used in a scanning optical system, the spacing between the surfaces a and a' of FIG. 2 is short and therefore, a very sharp refractive index gradient $\nabla n$ occurs with a result that movement of the imaging position becomes great.

However, what is important is that in equation (3), the inner product of the right side thereof and the direction cosine $\varkappa(s)$ of the light ray is 0, that is, it is only the component orthogonal to the direction $\varkappa(s)$ of the light ray in the refractive index gradient $\nabla n$ that gives the variation $d\varkappa(s)/d_s$ in the direction of the light ray, and the component $(\varkappa \cdot \nabla n)\varkappa$ parallel to the light ray $\nabla n$ does not vary the direction of the light ray.

Actually, numberless light rays different in angle of view and incidence position on the entrance pupil plane pass through the interior of the lens in various directions, and the general direction of travel of all of those light rays is the direction of the optical axis of the lens. Accordingly, if the component of $\nabla n$ orthogonal to the optical axis in the refractive index distribution $n(\varkappa)$ is made small, the influence imparted to the light ray by the non-uniformity of the refractive index can be reduced.

Moisture absorption occurs from the surface of the lens and therefore, in FIG. 5, the moisture permeating from the surface a progresses in the direction Ra of the normal to the surface a. As a result, the influence of the moisture absorption from the surface a creates a distribution of moisture having a sharp gradient in the direction of the normal to the surface a and accordingly, creates a refraction distribution having a sharp gradient $\nabla n$ in the direction $\mathbb{R}a$ of the normal to the surface a. Accordingly, reducing the component orthogonal to the optical axis of $\nabla n$ can be accomplished by eliminating the moisture absorption from the face in which the normal is orthogonal to the optical axis, namely, the face parallel to the optical axis. The influence of the moisture absorption from the faces orthogonal to the optical axis such as the faces b and b' of FIG. 5 causes such non-uniformity of refractive index that the refractive index gradient becomes parallel to the optical axis and therefore, the influence it imparts to the light ray is very small.

As shown in FIG. 5, the above-described face substantially orthogonal to the optical axis in the lens is the lens face and the face parallel to the optical axis is the non-lens surface. Accordingly, the influence the moisture absorption from the lens face imparts to the passed light ray is small and thus, only the non-lens surface can be subjected to moisture proof. No light ray passes through the non-lens surface and therefore, it is very easy to apply the moisture proof treatment thereto. If a non-effective portion through which light rays do not pass is present in the lens face, that portion may be subjected to a moisture proof treatment similar to that applied to the non-lens surface.

The reason why such moisture proof treatment is effective in the plastic lens used in the interior of a scanning optical system is that the influence of the moisture absorption from the non-lens surfaces a and a' is very strong due to the shape as shown in FIG. 2 which is short in the direction (y) orthogonal to the deflection plane. However, as previously described, the influence of the moisture absorption upon the light rays passing through the plastic lens can be reduced remarkably by subjecting only the light ray non-passage portion to the moisture proof treatment, and when the entire scanning optical system is considered, it is possible to make such a design that the influence of the moisture absorption from the lens face effective portion which is not subjected to the moisture proof treatment offers no problem in practice. An embodiment of the present invention will hereinafter be described.

Figure 6:
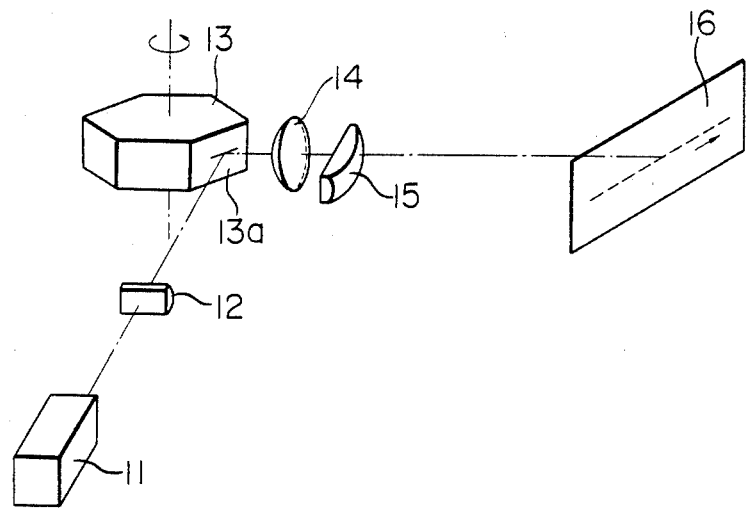
FIGS. 6, 7 and 8(A) and (B) illustrate an embodiment of the scanning optical system according to the present invention.

FIG. 6 shows the construction of an embodiment of the scanning optical system according to the present invention. There are disposed a light source device 11 comprising either a light source or a light source and a condensing device, a linear image forming system 12 for linearly imaging the light beam emitted from the light source device 11, a deflector 13 having its deflecting and reflecting surface 13a near a position whereat the light beam is linearly converged by the linear image forming system 12, a spherical single lens 14 between the deflector 13 and a medium 16 to be scanned, and a single lens 15 having different refractive powers in two orthogonal directions and having a toric surface having a main axis and an auxiliary axis (hereinafter referred to as the toric lens). An imaged spot is formed on the medium 16 to be scanned by a composite system comprising those lenses and the imaged spot scans the medium 16 with rotation of the deflector 13.

Figure 7:
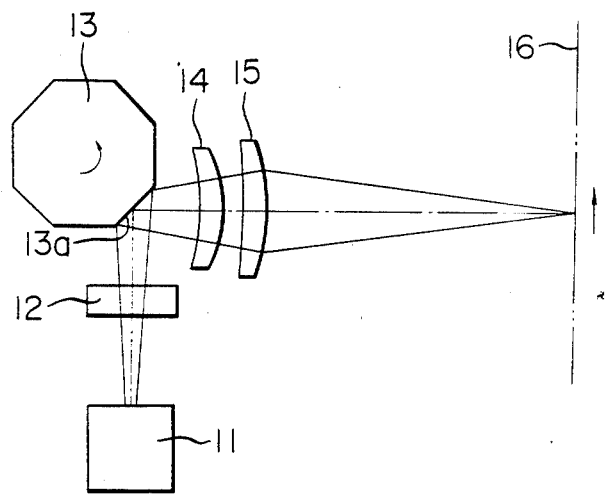

FIG. 7 is a view illustrating the function in the deflection plane of the above-described construction, or in other words, a plan view taken parallel to a plane containing the main axis of the toric lens 15 and the optical axis of the spherical single lens 14. The light beam emitted from the light source device 11 passes through the cylindrical lens 12, whereafter it is reflected by the reflecting surface 13a of the deflector 13 and the reflected light beam is deflected as the deflector 13 is rotated. The deflected light beam is imaged on the medium 16 to be scanned by the composite system comprising the spherical single lens 14 and the toric lens 15, and the scanning speed of the imaged spot is kept constant.

Figure 8A:
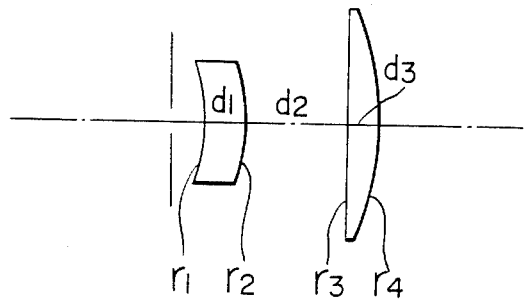
Figure 8B:
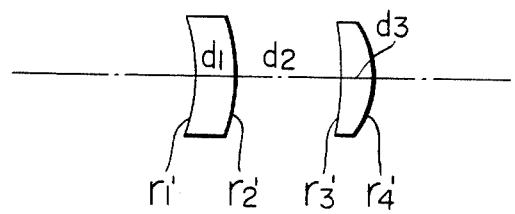

FIGS. 8A and 8B show the scanning lenses 14, 15 of the optical system shown in FIG. 6, with FIG. 8(A) showing a cross section parallel to the deflection plane and FIG. 8(B) showing a cross section perpendicular to the deflection plane.

Table 1 below shows lens data. In the table, $r_1-r_4$ represent the radii of curvature of the lenses in the plane parallel to the deflection plane, $r_1'-r_4'$ represent the radii of curvature of the lenses in the cross section perpendicular to the deflection plane (accordingly, as regards the spherical single lens 14, $r_1=r_1'$ and $r_2=r_2'$), $d_1$ represents the on-axis thickness of the spherical single lens 14, $d_2$ represents the on-axis air space between the $r_2$ surface of the spherical single lens 14 and the $r_3$ surface of the toric lens 15 (which is equal to the on-axis air space between the $r_2'$ surface of the spherical single lens 14 and the $r_3'$ surface of the toric lens 15), $d_3$ represents the on-axis thickness of the toric lens 15, $n_1$ represents the refractive index of the spherical single lens 14, and $n_2$ represents the refractive index of the toric lens 15.

Figure 9:
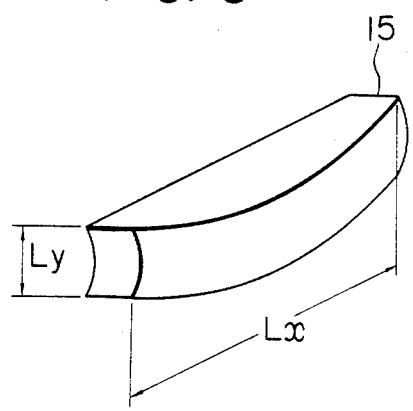
FIG. 9 shows an acryl toric lens used in the scanning optical system according to the present invention.

FIG. 9 shows the shape of the toric lens 15 in the present embodiment. In FIG. 9, Lx represents the length in the direction parallel to the deflection plane, and Ly represents the length in the direction perpendicular to the deflection plane. The material used for the toric lens is acryl of $Lx \approx 100$ mm and $Ly \approx 20$ mm.

Figure 12:
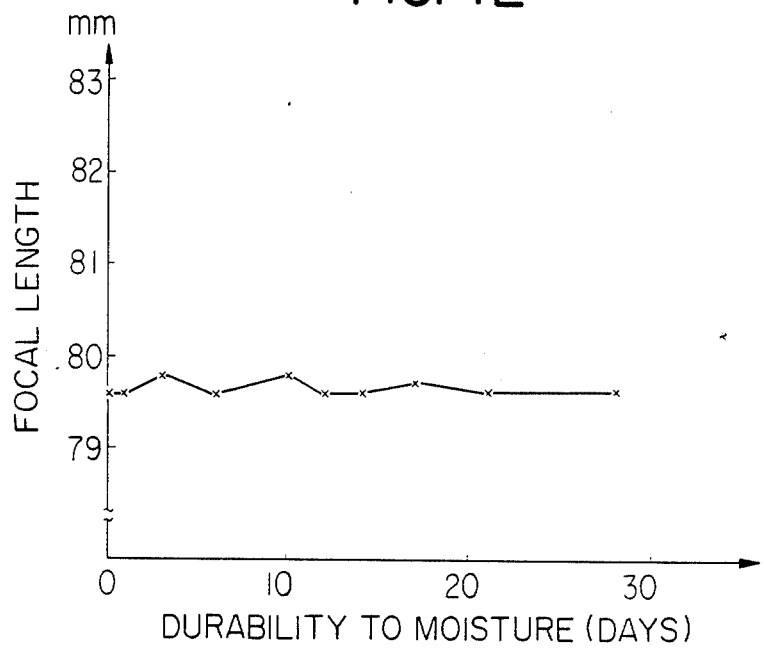
FIG. 12 is a graph showing the state of variation in focal length of the toric lens of FIG. 9 after it is subjected to the moisture proof treatment.

The term "focus" used hereinafter means, of two different linear image forming positions produced when a parallel light beam has been caused to be incident in parallelism to the main axis of the toric lens 15, the linear image forming position which is closer to the toric lens 15, and the radii of curvature $r_3$, $r_3'$, $r_4$, $r_4'$ and the on-axis thickness $d_3$ of the toric lens 15 used in the measurements of FIGS. 10 and 12 have values three times as great as the values shown in Table 1. Where the moisture proof treatment is not applied to this toric lens 15, the focus of the toric lens 15 itself is moved by moisture absorption in the manner as shown in FIG. 10.

Figure 10:
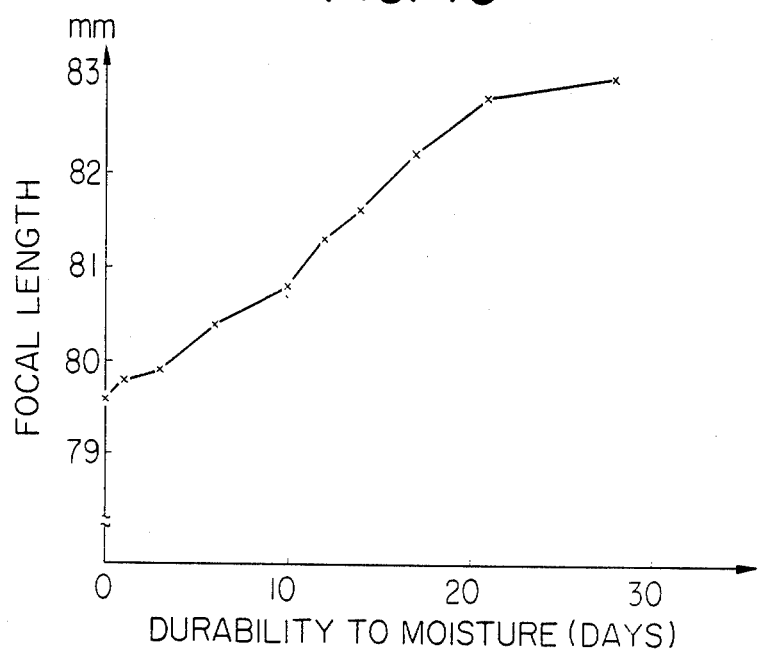
FIG. 10 is a graph showing the state of variation in focal length of the toric lens of FIG. 9 when it is not subjected to a moisture proof treatment.

In FIG. 10, the horizontal axis represents the number of days during which the toric lens was left in an environment of temperature 55° C. and humidity 95% and the vertical axis represents the distance from the toric lens 15 to the focus. As seen from FIG. 10, the amount of fluctuation of the focus position is about 3.5 mm.

Figure 11:
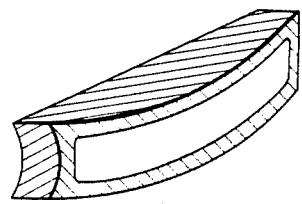
FIG. 11 shows the condition of the moisture proof processing applied to the toric lens of FIG. 9.

In contrast, when a toric lens having moisture-proof wax applied to the light ray non-passage portion thereof as shown in FIG. 11 was left under the same conditions as the above-mentioned environment and the focus movement thereof was examined, the amount of fluctuation thereof was within about 0.2 mm, and this is a very small amount as compared with the amount of fluctuation of 3.5 mm seen in the aforementioned case where the moisture proof treatment was not applied.

This acryl toric lens subjected to the moisture proof treatment has the same shape as the acryl toric lens not subjected to the moisture proof treatment and has been formed of the same material under the same molding conditions, but in the toric lens in the present embodiment, the effect resulting from very easy moisture proof treatment comprising applying wax only to the light ray non-passage portion thereof is remarkable. The movement of the focus position of the order of maximum 0.2 mm observed in FIG. 12 offers no practical problem in the scanning optical system according to the present embodiment.

Besides the above-described moisture proof treatment, metal foil such as, for example, aluminum foil may be adhesively secured to the light ray non-passage portion to obtain a similar effect.

TABLE 1

| $r_1$ | −25.076 | $r_1'$ | −25.076 | $d_1$ | 6.331 | $n_1$ | 1.78322 |
|---|---|---|---|---|---|---|---|
| $r_2$ | −30.325 | $r_2'$ | −30.325 | $d_2$ | 18.172 | | |
| $r_3$ | ∞ | $r_3'$ | −48.151 | $d_3$ | 5.416 | $n_2$ | 1.48330 |
| $r_4$ | −44.945 | $r_4'$ | −10.292 | | | | |

What we claim is:
1. An optical system for scanning a medium with a beam spot, said optical system comprising:
   means for supplying a light beam;

means for deflecting the light beam from said light beam supplying means in a predetermined direction and in a deflection plane;

means disposed between said deflecting means and said medium for imaging the light beam from said deflecting means on said medium as a beam spot, said imaging means having at least one lens element made of a moisture absorbing material the refractive index of which varies with the amount of moisture absorbed, said lens element having a shape in which the length in a direction parallel to the deflection plane of the light beam is greater than the length in a direction orthogonal to the deflection plane of the light beam; and means for mitigating the influence on the imaged condition of the light beam on the medium resulting from said lens element being subjected to moisture, said mitigating means including a moisture proof member provided only on the portion of the surface of said lens element through which the light beam does not pass.

2. An optical system according to claim 1, wherein said lens element is a plastic lens.

3. An optical system according to claim 1, wherein said moisture proof member is wax.

4. An optical system according to claim 1, wherein said moisture proof member is metal foil.

5. An optical system for scanning a medium with a beam spot, said optical system comprising:

means for supplying a light beam;

means for deflecting the light beam from said light beam supplying means in a predetermined direction and in a deflection plane;

means disposed between said deflecting means and said medium for imaging the light beam from said deflecting means on said medium as a beam spot, said imaging means having at least one lens element having a non-lens surface and being made of a moisture absorbing material the refractive index of which varies with the amount of moisture absorbed, said lens element having a shape in which the length in a direction parallel to the deflection plane of the light beam is greater than the length in a direction orthogonal to the deflection plane of the light beam; and means for mitigating the influence on the imaged condition of the light beam on the medium resulting from said lens element being subjected to moisture, said mitigating means including a moisture proof member provided only on said non-lens surface of said lens element.

* * * * *

UNITED STATES PATENT AND TRADEMARK OFFICE
CERTIFICATE OF CORRECTION

PATENT NO. : 4,523,801

DATED : June 18, 1985

INVENTOR(S) : TAKESHI BABA, ET AL.

It is certified that error appears in the above-identified patent and that said Letters Patent is hereby corrected as shown below:

On the Title Page, at Abstract, line 4, insert -- a -- after "in".

On the Title Page, at Abstract, line 8, change "mode" to -- made --.

Column 1, line 20, insert comma following "that".

Column 1, line 62, insert -- that are wasted -- after "hatching".

Column 2, line 15, change "that" to -- the --.

Column 3, line 55, change "x $\frac{d}{ds}$" to -- $\frac{dx}{ds}$ --

Column 4, line 51, change "ika" to -- Ra --.

*Signed and Sealed this*

*Twenty-ninth* Day of *July 1986*

[SEAL]

*Attest:*

DONALD J. QUIGG

*Attesting Officer*     *Commissioner of Patents and Trademarks*